United States Patent [19]

Srch et al.

[11] Patent Number: 5,114,125

[45] Date of Patent: May 19, 1992

[54] SUSPENSION ADJUSTMENT

[75] Inventors: James L. Srch, Clarendon Hills, Ill.; Robert L. Cadden, Parkdale, Australia

[73] Assignee: The Boler Company, Itasca, Ill.

[21] Appl. No.: 380,632

[22] Filed: Jul. 14, 1989

[30] Foreign Application Priority Data

Jul. 14, 1988 [AU] Australia .................. PI9279

[51] Int. Cl.⁵ ............................................ B60G 11/10
[52] U.S. Cl. ................................................. 267/265
[58] Field of Search ............... 267/7, 38, 260, 265; 280/680, 718, 661

[56] References Cited

U.S. PATENT DOCUMENTS

| | | | |
|---|---|---|---|
| 1,265,825 | 5/1918 | Sprague | 267/265 |
| 1,532,124 | 4/1925 | Cook et al. | 267/265 |
| 2,290,034 | 7/1942 | Carter | 267/265 |

Primary Examiner—Robert J. Oberleitner
Attorney, Agent, or Firm—Lockwood, Alex, FitzGibbon & Cummings

[57] ABSTRACT

Suspension adjustment for a suspension for a vehicle having a chassis frame and at least one pair of opposed transport wheels on opposite sides of the fore-and-aft axis of the vehicle, an axle extending between the wheels of each pair, the suspension including a pair of spring hangers attached to each opposite side of the chassis frame, and a leaf spring assembly on each side of the chassis frame interconnecting each pair of spring hangers with opposite ends of the axle in resilient load transfer relationship, each leaf spring assembly having a leaf spring with a spring eye at one end and a spring pin extending through the spring eye and through an aperture in an aperture providing formation rigidly secured to the one of the spring hangers to which the end of the leaf with the spring eye is interconnected, and mechanism for adjusting the fore-and-aft position of at least one end of an axle, the axle end adjusting mechanism comprising a first fastener adjustably fastening a spring hanger associated with an adjustable axle end in a plurality of fore-and-aft positions on the chassis frame, and/or a second fastener adjustably fastening an aperture-providing formation associated with an adjustable axle end in a plurality of fore-and-aft positions on the spring hanger associated with the adjustable axle end.

4 Claims, 5 Drawing Sheets

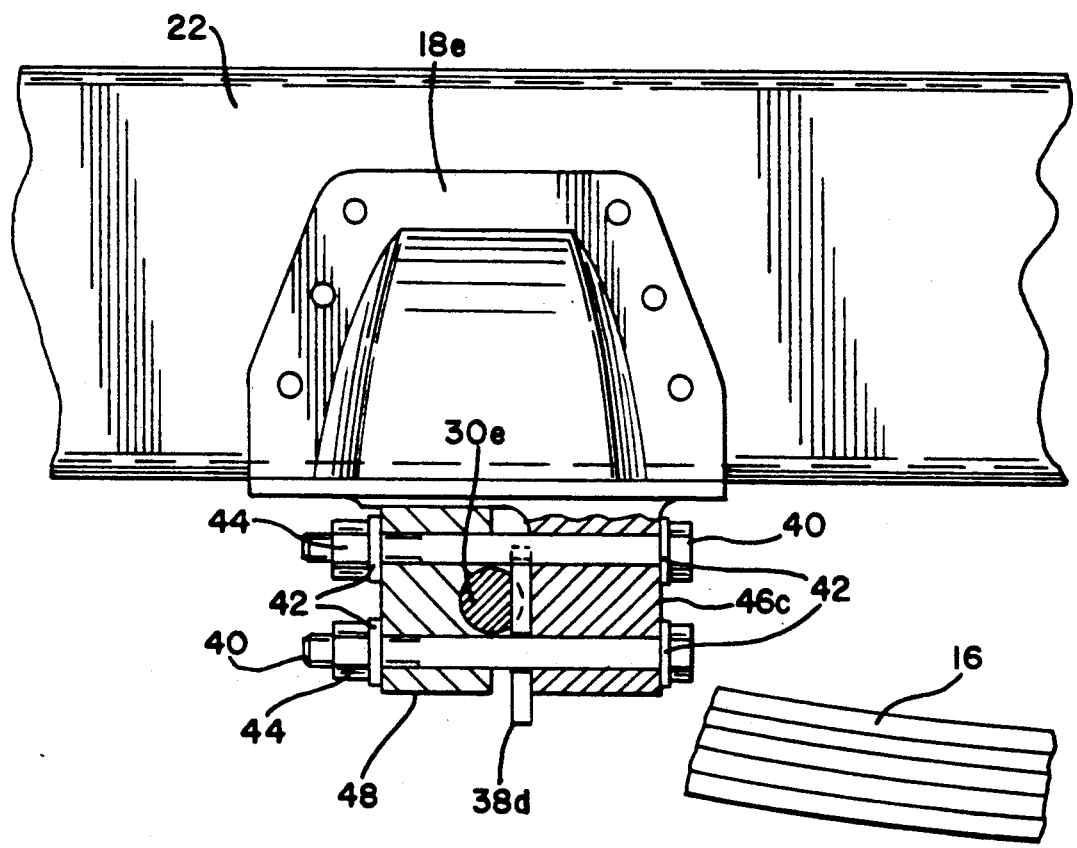

1

SUSPENSION ADJUSTMENT

FIELD OF THE INVENTION

This invention relates to vehicle suspension systems and more particularly, though not exclusively, to means for adjusting vehicle suspensions systems.

BACKGROUND

Known tandem drive vehicles, for example, may use suspensions incorporating equalising beams and leaf springs to cushion road shocks and to distribute weight equally between the tandem drive axles and transport wheels mounted thereon thereby improving traction. The springs are generally mounted on saddle assemblies above the equalising beams and connected at the front ends to front spring hangers with spring eye pins or spindles (hereinafter called "spring pins") through the spring eyes. The rear ends of the springs have no rigid attachment to the rear spring hangers and they are usually free to move forward and backward to accommodate spring deflection. The rear hangers may be provided with cam surfaces which allow for this movement of the spring. Spring hangers may be affixed to the frame or chassis of the vehicle by conventional fixing means such as bolts, washers and nuts.

It is generally seen to be of great advantage that the tandem drive axles be parallel to each other and properly aligned with respect to the longitudinal axis of the truck frame or chassis. Prior suspension systems have been found wanting in satisfactory means for adjustment of the alignment of the axle with respect to the vehicle frame or chassis. The Zneed for such adjustment has arisen in the last 2-3 years as a result of improvements in alignment measurement techniques, especially as a result of using laser-based equipment. If the axles and the wheels are properly aligned with the longitudinal axis of the vehicle frame, tire wear may be minimised and significant savings in fuel consumption may also be achieved.

Two methods have been developed in an effort to provide some form of alignment adjustment. Those methods have involved on the one hand to altering the position of the saddle assembly with respect to the leaf spring assembly and on the other hand, the fitting of an eccentric adaptor at the ends of the equalising beams where they are attached to the vehicle axles. The former method is time consuming and arduous as it usually involves disassembling the saddle assembly and the leaf spring assembly.

SUMMARY OF THE INVENTION

This invention is concerned with different means for alignment adjustment and relates to moving the spring hanger(s) containing the spring pin(s) (hereinafter called "the spring hanger(s)") and/or the spring pin(s) relative to the spring. It is believed that methods of adjustment according to the present invention provide a safer and more effective means of alignment adjustment. The resulting adjustment is believed to be more durable than can be achieved by known methods. It is believed that this invention may be used for vehicles having single or multiple drive axles, as well as for non-drive axles for vehicles such as trailers. With suitable modifications, the invention may be used for suspensions incorporating springs other than leaf springs.

It is an object of this invention to provide for adjusting the alignment of vehicle axles with respect to the vehicle frame.

According to one aspect of this invention there is provided a suspension for a vehicle having a chassis frame and at least one pair of opposed transport wheels on opposite sides of a fore-and-aft axis of said vehicle, an axle extending between the wheels of each said pair, said suspension including a pair of spring hangers attached to each opposite side of said chassis frame, and a leaf spring assembly on each side of said chassis frame interconnecting each said pair of spring hangers with opposite ends of said axle in resilient load transfer relationship, each said leaf spring assembly having a leaf spring with a spring eye at one end and a spring pin extending through said spring eye and through an aperture in an aperture-providing means rigidly secured to the one of said spring hangers to which said end of said leaf with said spring eye is interconnected, and means for adjusting the fore-and-aft position of at least one end of said axle, said axle end adjusting means comprising a first fastener means adjustably fastening a said spring hanger associated with a said adjustable axle end in a plurality of fore-and-aft positions on said chassis frame, and/or a second fastener means adjustably fastening a said aperture-providing means associated with said adjustable axle end in a plurality of fore-and-aft positions on said spring hanger associated with said adjustable axle end.

According to a particular aspect of this invention there are provided means for adjusting the alignment of vehicle axles with respect to the vehicle chassis frame wherein the vehicle suspension assemblies are provided with means for moving spring attachment means fore-and-aft with respect to the vehicle chassis frame. Preferably there is provided a suspension as aforesaid wherein said first fastener means includes a plurality of fore-and-aft elongated slot opening means said associated spring hanger and bolts extending through said slot opening into said chassis frame. Such fore-and-aft movement will permit adjustment of the said associated spring hanger relative to the vehicle chassis frame and with it the position of the spring pin and spring eye and hence that part of the axle that is on that side of the vehicle.

Such fore-and-aft movement can permit adjustment of the spring hanger relative to the vehicle frame and with it the position of the spring pin and spring eye and hence the axles that are on that side of the vehicle. As there are spring hangers on each side of the vehicle, adjustment of axles is possible on both sides. This allows for a wide range of axle re-alignment.

According to another particular aspect of the invention the spring hanger may remain substantially fixed relative to the vehicle frame. However, the position of the spring pin may be adjustable fore-and-aft within the spring hanger. This permits of an axle re-alignment facility in a manner similar to that aforesaid. Thus according to this aspect of the invention there is provided a suspension for a vehicle as aforesaid wherein said second fastener means includes at least one lug depending from the associated spring hanger, a clamp block having an upper surface engageable in bearing relationship with a bearing surface of said spring hanger, a side surface juxtaposed to a surface of said lug and a spring pin clamping surface, at least one spacer shim positioned between said side surface and said lug surface, and nut and bolt means interconnecting said clamp block to said depending lug with said respective surfaces secured in engagement and said spacer shim(s) secured in said position. Preferably there is at least one bolt-receiving hole comprised of registering holes in said lug, said clamp block and each said spacer shim.

Optionally, the above-said clamp block comprises two parts mating together at engaging surfaces, and each said spring pin clamping surface having one part located in one of said vertical surfaces and another part located in the other vertical surface. The clamp block may be attached with bolts, nuts and washers, or by any other suitable fixing means, to a lug depending from the spring hanger.

As previously mentioned one or more spacer shims of pre-selected thickness(es) may be inserted between the clamp block and the spring hanger. By varying the number and/or thickness of spacer shims, it is possible to adjust or vary the position of a spring pin relative to the spring hanger and thus re-align the axle. The spring clamp block preferably is designed to contact a lower horizontal surface of the spring hanger to relieve the bolt, nut and washer assembly(ies) or other fixing means, of whole or part of the vertical load transmitted through the suspension.

In a further embodiment of the invention, the split clamp block may be clamped independently, and located securely but releasably between a pair of spaced lugs depending from the spring hanger. There may be two side surfaces on the said clamp block each of which is juxtaposed to a surface of the adjacent one of said lugs. One or more spacer shims of preselected thickness(es) can be placed either side of the clamp block so that the position of the clamp block and spring pin assembly may be adjusted relative to the spring hanger.

In yet another embodiment of the invention, the split clamp block may be replaced by a one piece clamp block which may be described as a half-cap, the spring hanger being provided with a single lug. The spring pin may be provided with flats on one side to mate with one or more spacer shims of pre-selected thickness(es) which may be inserted between said flats and the single spring hanger lug.

The upper face of the half-cap may contact a lower face on the spring hanger to thereby support vertical loading. Thus according to this aspect of the invention there may be provided a suspension as hereinbefore described wherein the clamp block is in one piece with said spring pin clamping surface lying in part in a lower part of said side surface and in part in a portion of said clamp block overhanging said portio of said side surface.

In another aspect of the invention, there is provided a suspension as aforesaid wherein said second fastener means comprise at least one lug depending from said associated spring hanger with a first bolt-receiving hole extending transversely therethrough, said spring pin having a second bolt-receiving hole extending transversely therethrough aligned in registration with said first bolt-receiving hole, at least one spacer shim positioned between said spring pin and said lug and having a third bolt-receiving hole aligned in registration with said first and second bolt-receiving holes and nut and bolt means having a bolt extending through said aligned bolt-receiving holes and interconnecting each said depending lug, spring pin and spacer shim. This embodiment avoids the need for a clamp block, as the spring pin is drilled so that retaining bolts pass through the pin itself. This type of pin is generally known as a bar pin. The bar pin may have flats on either side and one or more spacer shims of pre-selected thickness(es) may be inserted between the bar pin and the spring hanger lug/s. Rearrangement, removal or insertion of the shims provides for adjustment of the spring pin position in the fore-and-aft direction relative to the spring hanger. The spring pin, or bar pin may be provided with a top planar surface which has upward bearing engagement with a planar bearing surface on said spring hanger.

Alternatively, two spaced lugs may depend from said associated spring hanger on opposite sides of said bar pin with first and second bolt-receiving holes extending transversely through said lugs in aligned registration, at least one spacer shim being positioned between at least one side of said bar pin and the one of the said lugs adjacent to said side, said bar pin and each said spacer shims having third and fourth bolt-receiving holes respectively therein in registration with said first and second bolt-receiving holes. The bar pin may have a top planar surface which has upward bearing engagement with a planar bearing surface on said spring hanger and further may have a pair of flat surfaces on opposite sides which engage the adjacent of said spacer shims.

According to yet another aspect of the invention there is provided a method for alignment of vehicle axles with respect to the vehicle frame wherein spring attachment means in vehicle suspension assembly(ies) are moved for-and-aft with respect to the vehicle frame.

In order that the invention may be more clearly understood, various embodiments are described with reference to the accompanying non-limiting drawings in which:

FIG. 9 is a side view, in partial section, of an adjustable spring hanger according to another embodiment of the invention.

Throughout the drawings, 18 designates a spring hanger and 16 designates a leaf spring assembly.

Figure 1:
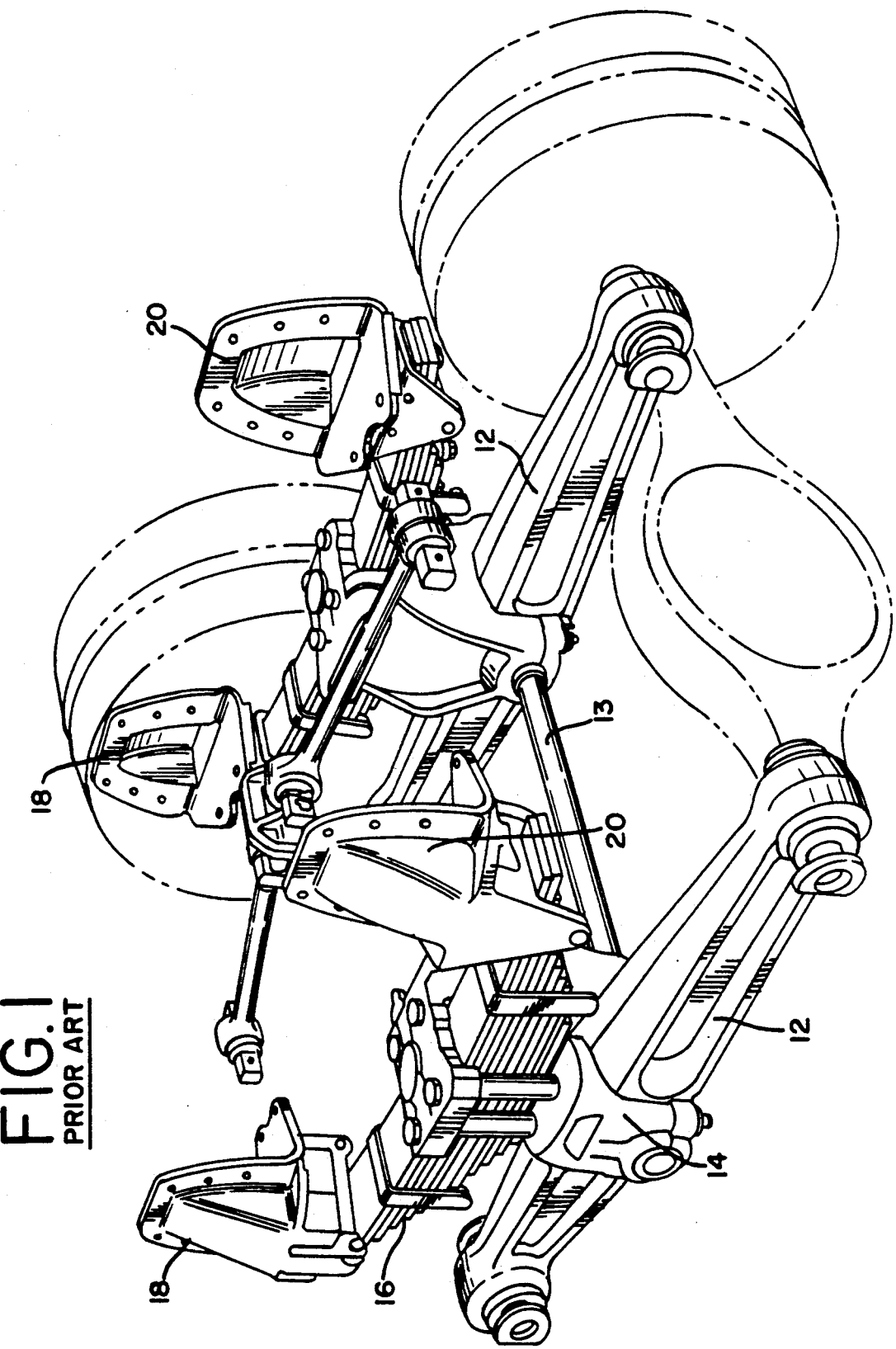
FIG. 1 is a perspective drawing of a known tandem axle suspension.

In FIG. 1, equalising beams 12 can pivot on a cross tube 13 which is mounted on saddle assemblies 14. Leaf springs 16 are mounted on saddle assemblies 14 above equalising beams 12 and are connected at the front ends thereof to front spring hangers 18. The rear ends of the springs have no rigid attachment to the rear spring hangers 20 and are free to move backwards and forwards to accommodate spring deflection.

Figure 2:
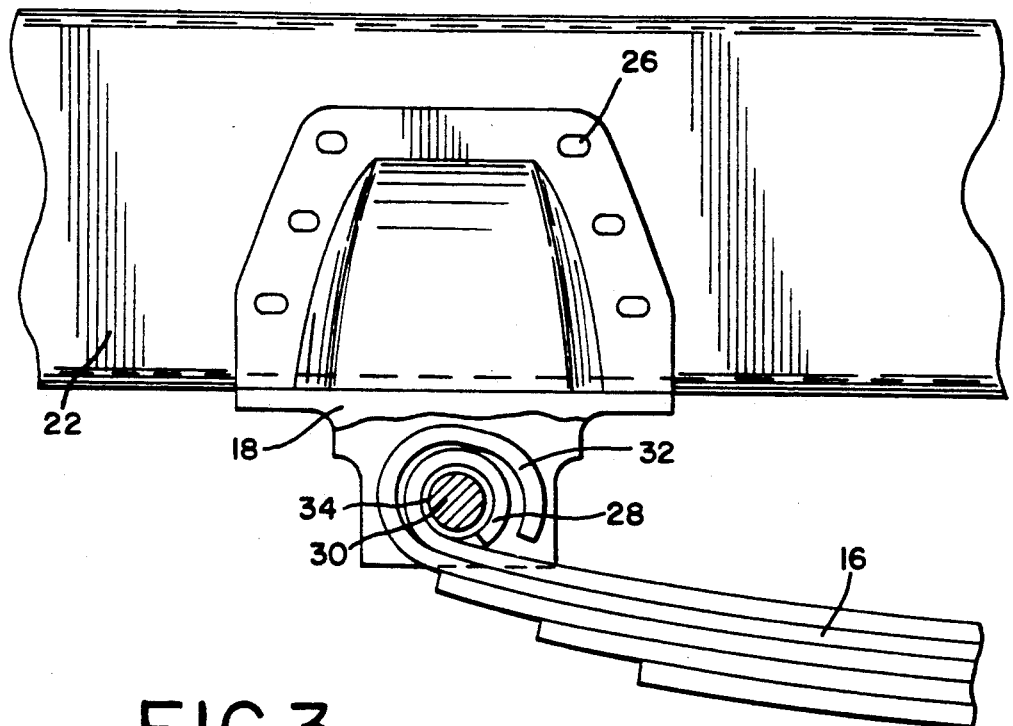
FIG. 2 is a side view of an adjustable spring hanger according to the one aspect of the invention including a sectional view of the spring pin and spring eye assembly.

In FIG. 2, front spring hanger 18 may be releasably affixed to vehicle chassis frame 22 by bolts nuts and washers (not shown), or by any other conventional fixing means passing through holes 26 in spring hanger 18 and corresponding holes (not shown) in vehicle chassis frame 22. A vehicle chassis frame liner may also be present. The spring pin 30 is mounted fixedly but releasably in spring hanger 18 by conventional means so that spring pin 30 does not rotate. A spring eye bush 34 is provided around spring pin 30. Spring main leaf 28 is curved to form an eye providing a snug yet rotatable fit around spring eye bush 34. Spring wrapper leaf 32 is also curved but not to the extent to provide a closed eye or loop. In use, spring 16 can turn relative to spring pin 30. Direct contact between spring main leaf 28 and spring pin 30 is avoided to prevent unwanted wear. The holes 26 are modified to take the form of slots so that spring hanger 18 ca be moved either fore-or-aft with reference to the holes in the vehicle frame 22.

Figure 3:
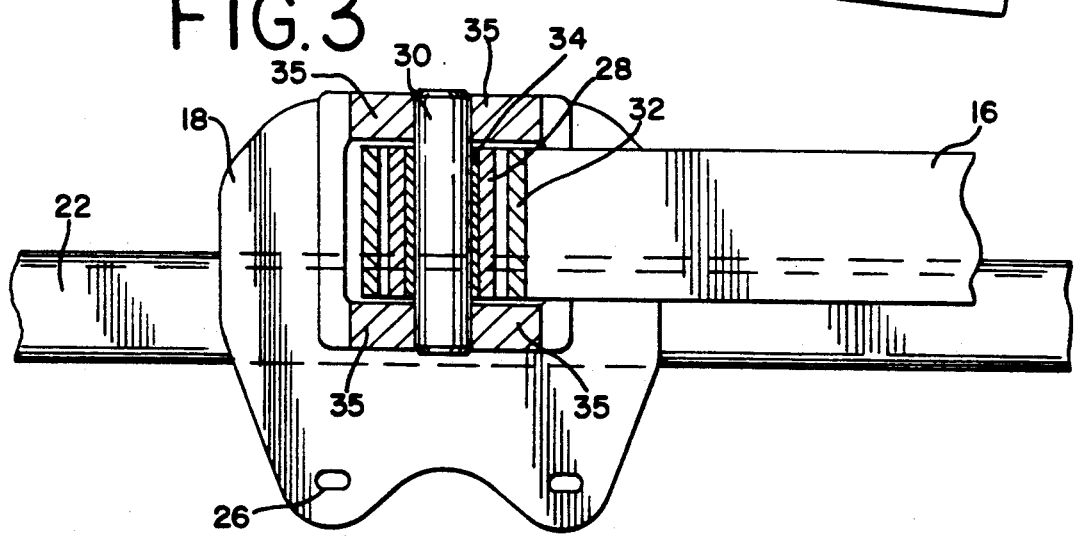
FIG. 3 is a view, in partial section, from beneath an adjustable spring hanger as shown in FIG. 2.

In FIG. 3, spring pin 30, spring eye bush 34, spring main leaf 28, spring wrapper leaf 32 and holes 26 are as aforesaid, and 35 denotes lugs depending from spring hanger 18.

Figure 4:
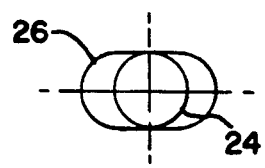
FIG. 4 is an enlarged view of a slot in an adjustable spring hanger.

FIG. 4 shows the relative relationship between holes 26 in spring hanger 18 and holes 24 in vehicle chassis frame 22. The dimensions of holes 26 are such that a relatively significant amount of fore-and-aft movement is possible when the fastenings are sufficiently loosened.

Figure 5:
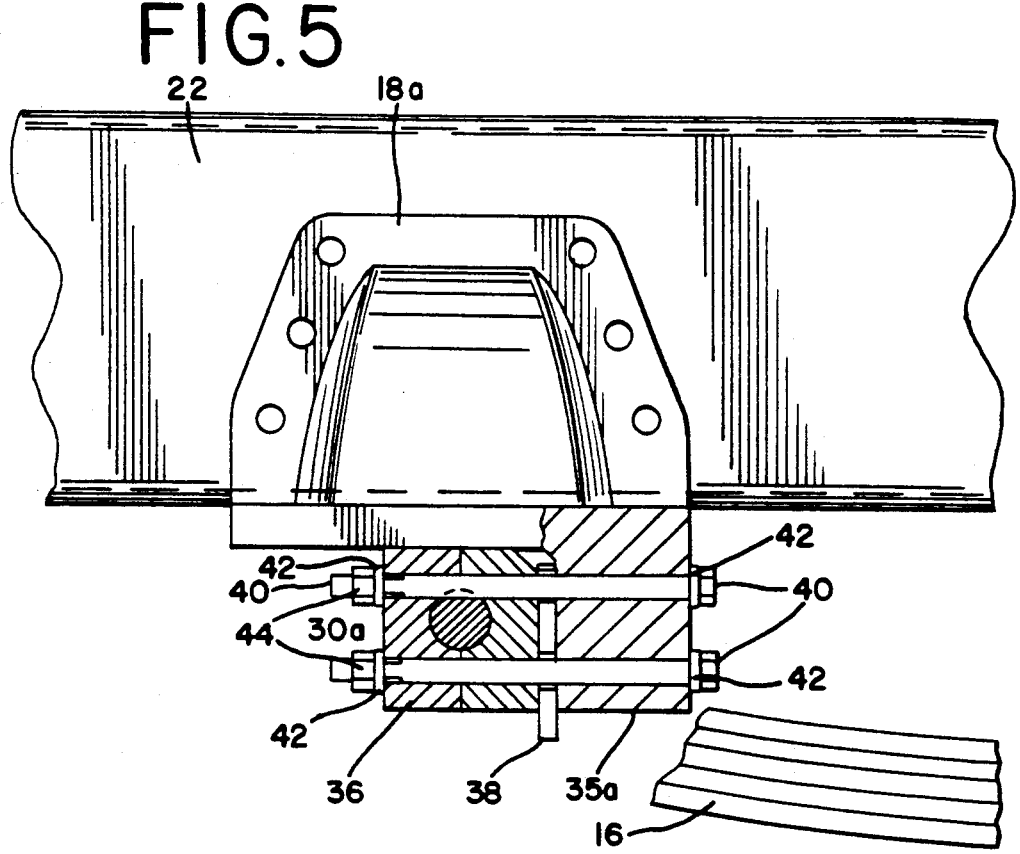
FIG. 5 is a side view, in partial section of an adjustable spring hanger according to another embodiment of the invention.

In FIG. 5, 30a designates a spring pin held within a split clamp block 36 by bolts 40 nuts 42 and washers 44. The top of the split clamp block 36 is in contact with a lower face of spring hanger 18a so that loads are transferred to the spring through the split clamp block and spring pin via the spring hanger, and are not imposed on bolts 40. The shims 38 between split clamp block 36 and lug 35a may be of preselected thicknesses and may be provided with holes to accommodate bolts 40 so that they can he secured in position pending fastening of the nuts 44 on bolts 40. Insertion of one or more shims 38 would lead to forward movement of spring pin 30a with respect to spring hanger 18a. Corresponding movement of spring 16 would ensue.

Figure 6:
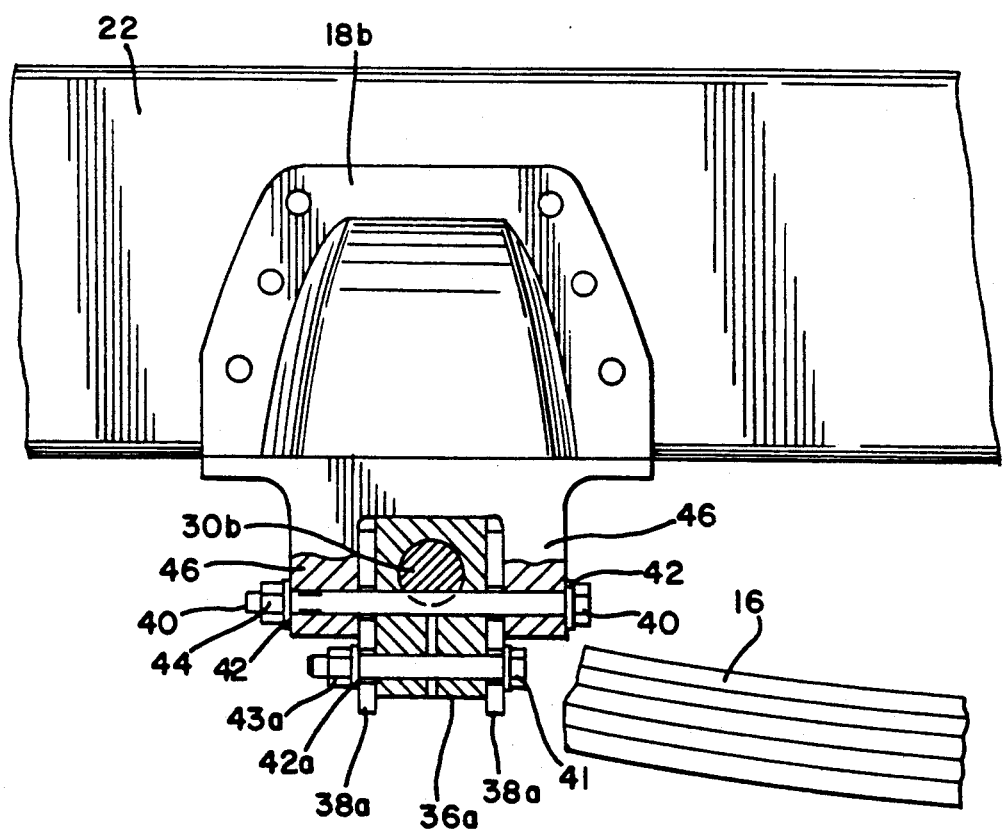
FIG. 6 is a side view, in partial section, of an adjustable spring hanger according to another aspect of the invention.

In FIG. 6, 30b denotes a spring pin held within a split clamp block 36a. A split clamp block 36a is clamped independently by bolt 41, washers 42a and nut 43a. Spacer shims of preselected thicknesses 38a may be inserted on either side of, or on both sides of, split clamp block 36a. The insertion or deletion of spacer shims 38a leads to corresponding fore-or-aft movement of split clamp block 36a and spring pin 30b relative to the position of the spring hanger 18b. The split clamp block and spacer shims are held within lugs 46 of spring hanger 18b by bolts 41 washers 42 and nuts 43.

Figure 7:
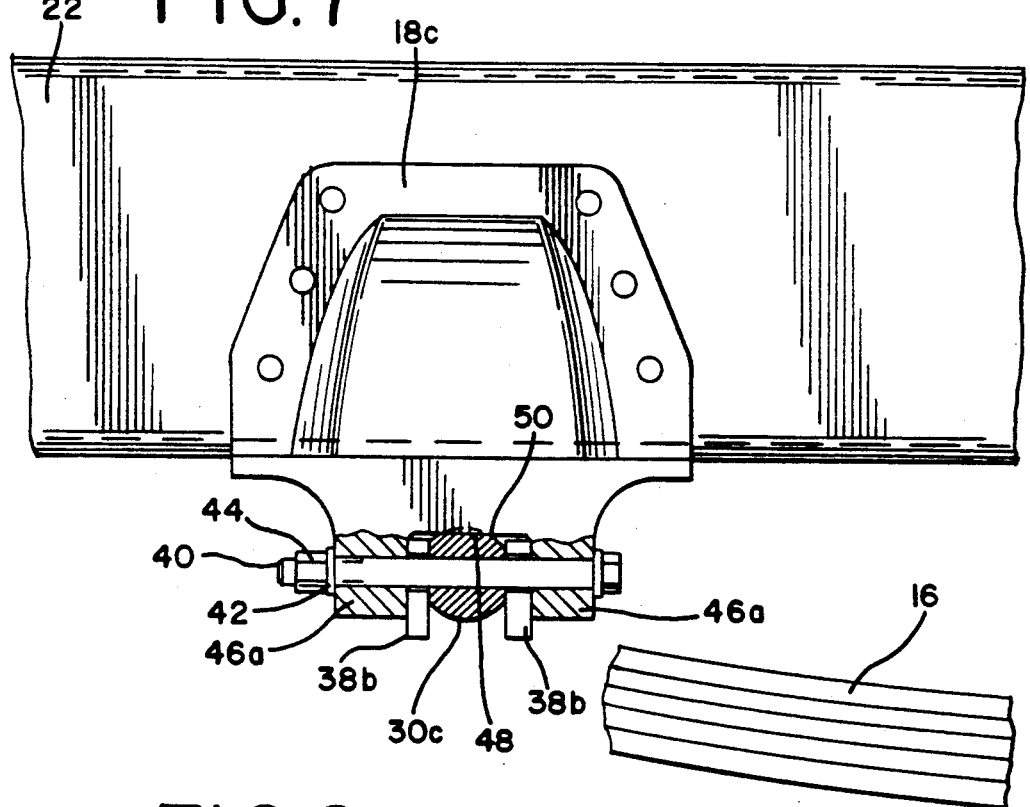
FIG. 7 is a side view, in partial section, of an adjustable spring hanger according to another embodiment of the invention.

In FIG. 7, 30c represents a spring pin which is drilled through and held by bolts 40 washers 42 and nuts 44 between two lugs 46a depending from spring hanger 18. Spring pin 30c has flats machined so that they and the corresponding faces of the lugs 46a are parallel or substantially parallel. Spacer shims 38b of preselected thicknesses may be inserted between the flats of the spring pin 30c and the corresponding faces of the lugs 46a. The insertion or deletion of such spacer shims leads to fore-or-aft movement of spring pin 30c with respect to spring hanger 18c. Spring pin 30c has a top planar surface or flat 48 which has upward bearing engagement with a planar bearing surface 50 on spring hanger 18c so that bolts 40 take minimal or no shear loads.

Figure 8:
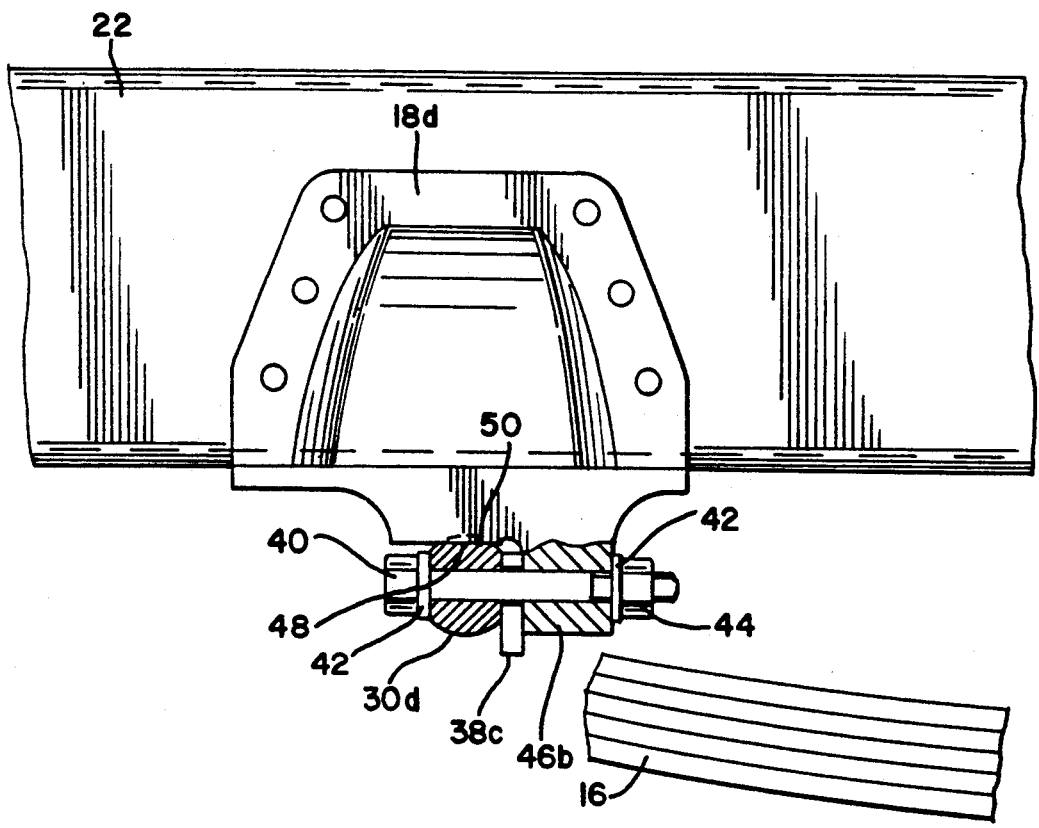
FIG. 8 is a side view, in partial section, of an adjustable spring hanger according to another embodiment of the invention.

In FIG. 8, 30d denotes a spring pin drilled through and held in position against one or more spacer shims 38c by bolt 40 washers 42 and nut 44. As previously stated spacer shims 38c can be of preselected thicknesses and preselected numbers. The insertion of spacer shims between the flat of the spring pin and the corresponding face of lug 46b leads to forward movement of spring pin 30d relative to spring hanger 18d. Conversely, the deletion of spacer shims or the replacement of thicker spacer shims by thinner spacer shims leads to aft movement of spring pin 30d with respect to position of spring hanger 18d. Spring in 30d has a top planar surface or flat 48a which has upward bearing engagement with a planar bearing surface 50a on spring hanger 18d so that bolts 40 take minimal or no shear loads.

In FIG. 9, spring pin 30e is machined flat on one side at its end and is held in position by half-cap 48, one or more spacer shims 38d, and lug 46c by means of bolts 40 washers 42 and nuts 44. The insertion or deletion of spacer shims 38 allows for fore or-aft movement of spring pin 30e relative to spring hanger 18e.

It is to be understood that various additions, alterations and modifications may be introduced into the foregoing without departing from the ambit of the invention.

We claim:

1. A suspension for a vehicle having a chassis frame and at least one pair of opposed transport wheels on opposite sides of the fore-and-aft axis of said vehicle, an axle extending between the wheels of each said pair with the wheels being mounted on the opposite ends of the axle, said suspension including a pair of spring hangers attached to each opposite side of said chassis frame, and a leaf spring assembly on each side of said chassis frame interconnecting the pair of spring hangers on that side in resilient load transfer relationship with the end of said axle on that side, each said leaf spring assembly having a leaf spring with a spring eye at one end and a spring pin extending through said spring eye and through an aperture in an aperture-providing means rigidly secured to the one of said spring hangers to which said end of said leaf with said spring eye is interconnected, and means for adjusting the fore-and-aft position of at least one end of said axle, said axle end adjusting means comprising fastener means adjustably fastening one of said spring hangers associated with one of said adjustable axle ends in a plurality of fore-and-aft positions on said chassis frame, said fastener means comprising at least one lug depending from said associated spring hanger with a first bolt-receiving hole extending fore-and-aft therethrough, said spring pin having a second bolt-receiving hole extending fore-and-aft therethrough aligned in registration with said first bolt-receiving hole, at least one spacer shim positioned between said spring pin and said lug and having a third bolt-receiving hole aligned in registration with said first and second bolt-receiving holes, and nut and bolt means wherein a bolt extends through said aligned bolt-receiving holes and interconnecting each said depending lug, spring pin and spacer shim.

2. A suspension as claimed in claim 1 wherein said spring pin has a top planar surface which has upward bearing engagement with a planar bearing surface on said spring hanger and has a flat side surface which engages said spacer shim.

3. A suspension as claimed in claim 1 wherein two spaced lugs depend from said associated spring hanger on opposite sides of said spring pin with first and second bolt-receiving holes extending transversely through said lugs in aligned registration, at least one spacer shim positioned between at least on side of said spring pin and the one of said lugs adjacent to said side, said spring pin and each said spacer shims having third and fourth bolt-receiving holes respectively therein in registration with said first and second bolt-receiving holes.

4. A suspension as claimed in claim 3 wherein said spring pin has a top planar surface which has upward bearing engagement with a planar bearing surface on said spring hanger and has a pair of flat surfaces on opposite sides which engage the adjacent of said spacer shims.

* * * * *